United States Patent
Gupta

(10) Patent No.: US 10,026,332 B1
(45) Date of Patent: Jul. 17, 2018

(54) METHOD TO DELIVER CONTEXTUAL EDUCATIONAL INFORMATION UTILIZING SMART WEARABLES

(71) Applicant: Jasmine Gupta, Irvine, CA (US)

(72) Inventor: Jasmine Gupta, Irvine, CA (US)

(*) Notice: Subject to any disclaimer, the term of this patent is extended or adjusted under 35 U.S.C. 154(b) by 0 days.

(21) Appl. No.: 15/483,937

(22) Filed: Apr. 10, 2017

(51) Int. Cl.
| | |
|---|---|
| *G09B 7/02* | (2006.01) |
| *G09B 5/06* | (2006.01) |
| *G09B 5/02* | (2006.01) |
| *G09B 5/04* | (2006.01) |
| *G06F 17/30* | (2006.01) |

(52) U.S. Cl.
CPC ............ *G09B 7/02* (2013.01); *G09B 5/06* (2013.01); *G09B 5/065* (2013.01); *G06F 17/30041* (2013.01); *G09B 5/02* (2013.01); *G09B 5/04* (2013.01)

(58) Field of Classification Search
CPC . G09B 7/02; G09B 5/06; G09B 5/065; G09B 5/02; G09B 5/04; G06F 17/30041
See application file for complete search history.

(56) References Cited

U.S. PATENT DOCUMENTS

| | | | |
|---|---|---|---|
| 7,016,532 B2 | 3/2006 | Boncyk | |
| 8,206,217 B2 | 6/2012 | Witchey | |
| 9,489,612 B2 | 11/2016 | Boulby | |
| 2007/0011138 A1* | 1/2007 | Boucard | ............ G06F 17/3002 |
| 2008/0009421 A1 | 4/2008 | Amador | |
| 2008/0016827 A1 | 7/2008 | Kulakowski | |
| 2008/0023862 A1 | 10/2008 | Oldham | |
| 2009/0093109 A1* | 4/2009 | Morozumi | ........... B23K 35/262 |
| | | | 438/612 |
| 2009/0025867 A1 | 10/2009 | Chava | |
| 2010/0000583 A1 | 1/2010 | Johnson | |
| 2010/0010914 A1* | 1/2010 | Park | ........................ G09B 7/04 |
| | | | 434/322 |
| 2010/0018215 A1 | 7/2010 | Edelstain | |
| 2012/0004236 A1 | 2/2012 | Moosavi | |
| 2012/0032396 A1 | 12/2012 | Gamaley | |
| 2013/0025395 A1 | 9/2013 | Vanderpohl | |

(Continued)

FOREIGN PATENT DOCUMENTS

| | | |
|---|---|---|
| AU | 2003203937 | 5/2002 |
| CN | 102332106 | 1/2012 |

OTHER PUBLICATIONS https://teach.com/what/teachers-teach/learning-styles, 2017.
(Continued)

*Primary Examiner* — Eddy Saint-Vil
(74) *Attorney, Agent, or Firm* — Fish IP Law, LLC

(57) ABSTRACT

Educational information is provided to a user associated with a trigger object, and an education-related user attribute. Contemplated trigger objects include wearables, and especially pieces of jewelry. Contemplated education-related user attributes include current age, gender, subject being studied, current grade level, hobby, ethnicity, profession, vocation, location of interest, topic of interest, time period of interest, event of interest, favorite sport, favorite team, current school, color preference, resource preference, brand affinity, and expertise level. The educational information can be rendered directly on the trigger object, or on any other electronic rendering device.

17 Claims, 6 Drawing Sheets

(56) References Cited

U.S. PATENT DOCUMENTS

| | | | | |
|---|---|---|---|---|
| 2013/0268293 A1* | 10/2013 | Knudson | ............... | G06Q 50/22 |
| | | | | 705/2 |
| 2015/0099946 A1* | 4/2015 | Sahin | ...................... | A61B 5/16 |
| | | | | 600/301 |
| 2016/0203663 A1* | 7/2016 | Proctor | .............. | G07C 9/00111 |
| | | | | 345/8 |
| 2016/0217496 A1* | 7/2016 | Tuchman | .......... | G06Q 30/0269 |
| 2016/0314700 A1* | 10/2016 | Butler | .................... | G09B 5/125 |
| 2017/0103664 A1* | 4/2017 | Wong | ...................... | G09B 7/00 |

OTHER PUBLICATIONS https://www.understood.org/en/school-learning/partnering-with-childs-school/instructional-strategies/5-common-techniques-for-helping-struggling-students, 2014-2017.

https://en.wikipedia.org/wiki/QR_code, last modified on Mar. 29, 2017.

\* cited by examiner

METHOD TO DELIVER CONTEXTUAL EDUCATIONAL INFORMATION UTILIZING SMART WEARABLES

FIELD OF THE INVENTION

The field of the invention is jewelry and other wearables.

BACKGROUND

The following description includes information that may be useful in understanding the present invention. It is not an admission that any of the information provided herein is prior art or relevant to the presently claimed invention, or that any publication specifically or implicitly referenced is prior art.

Conventional and digital aids are widely used to impart educational information. Books, flashcards, graphics, videos are a few of the sources utilized to deliver educational content. For example, a teacher can introduce new vocabulary to students by reading a textbook or showing an animated video related to that vocabulary. However, the ability of an individual to grasp understanding of new vocabulary or other information is influenced by their cognitive, emotional and environmental factors. Some understand better through listening and speaking, while others may learn best by interacting with peers <Ref1 https://teach.com/what/teachers-teach/learning.styles/>. Yet, in other cases, some individuals learn new information faster and retain better when they can associate knowledge with physical trigger objects that they touch, and in some cases, even carry around with them. <Ref2 https://www.understood.org/en/school-learning/partnering-with-childs-school/instructional-strategies/5-common-techniques-for-helping-struggling-students> For example, a pyramid-shaped bracelet charm could serve as a trigger to provide information about ancient Egyptian pyramids.

Another benefit of using a physical trigger object could be to provide contextually relevant educational lessons, in pieces. For example, a pyramid-shaped charm can be used to introduce basic math concept of a pyramid, and later to introduce advanced level math formulas related to pyramids. The methodology of teaching complex concepts by breaking down the concepts into simpler pieces has been found to be an effective way for students to organize and synthesize new information. The physical trigger object can also be used to reinforce the concepts introduced to the students in school.

It is also known in some circumstances to use modern electronics (e.g., cell phones and smart watches) as electronic assistants to provide educational information. But the information obtained is not particularly related to the device. For example, one could find information about ancient Egypt using a smart watch. But the smart watch has no particular connection to ancient Egypt, so it would be difficult for a student or other user to associate the watch with such information, and therefore to use the watch as a trigger object.

One way of coupling a trigger object to relevant information is to tag the trigger object, and then use a reader of some sort to retrieve the information. Of course, many objects are currently tagged with QR or bar codes. <Ref3 https://en.wikipedia.org/wiki/QR_code> However, information sourced using such codes are intended for commercial purposes, such as product tracking, item identification etc. For example, a bar code on a carton of milk can be used to obtain the price or expiration date on that particular carton, not information on milk in general. It could be of considerable educational value if tagged objects could be used to provide educational information to students and others, rather than merely commercial information. This value is further enhanced, if the educational information delivered to student is contextually associated with the tagged object.

Also, conventional tagging of objects has not been used to obtain information that is geared to education-related attributes of individual person. For example, any purchaser of a carton of milk will get the same price as any other person who is similarly situated (time of day, employment status, etc). It could be of considerable educational benefit if tagged objects could be used to provide educational information to students and others, based on one or more education-related attributes of the specific user, for example age, gender, favorite subject, current grade level, hobby, topic of interest, sports, team, or school.

It is known for game pieces (perhaps a tiny sword or gun) to be tagged, and to utilize the tags to establish some right or privilege in a game. See e.g., U.S. Pat. No. 8,206,217. But there again, the information retrieved is not geared to any education-related attribute of the specific user.

Systems (e.g. NANT ID™) are also known that utilize an image of an object to identify the object, and to retrieve price, marketing or other commercial information related to that object. See e.g., U.S. Pat. No. 7,016,532. For example, imaging of a Mercedes™ automobile driving by could retrieve for the user an address of a local Mercedes dealer. But the information retrieved is not geared to any education-related attribute of the specific user.

Systems are also known that utilize a bracelet or watch to obtain location information for a user. But of course, the information retrieved would again be the same regardless of which person was wearing the item. The information retrieved would not be geared to any education-related attribute of the specific user.

Similarly, although numerous wearables and toys are currently used to provide educational information (e.g., Fischer-Price™ toys, Leap Frog™), the information is not retrieved based upon any education-related attribute of the specific user.

Thus, there is still a need for methods and apparatus to deliver contextually relevant educational information using smart wearable objects such as jewelry, toys or similar devices, and based upon education-related attributes of the specific user.

SUMMARY OF THE INVENTION

The inventive subject matter provides apparatus, systems and methods in which a wearable trigger object is used to provide educational information to a student or other user.

Preferred embodiments use an electronic reader device, external to the wearable, to derive identification information from the wearable trigger object. The identification information is then utilized, in conjunction with an education-related attributes of the specific user, to source the educational content. At least some of the educational information is preferably sourced external to the electronic rendering device.

Contemplated education-related user attributes include current age, gender, subject being studied, current grade level, hobby, ethnicity, profession, vocation, location of interest, topic of interest, time period of interest, event of interest, favorite sport, favorite team, current school, color preference, resource preference, brand affinity, and expertise level.

All suitable rendering devices are contemplated to render the educational information to the user, including for example, a desktop computer, a laptop, a cell phone, a wearable, a smart phone, a smart watch, a suitable digital assistant, and a tablet.

As used herein, the term "educational content" means information included in an educational curriculum. This can include, for example, history, math, science, geography, and languages information relating to the physical trigger object. As used herein, the term "educational information" excludes purely promotional or other commercial information, and thus excludes price, size and other info specific to a particular object. For example, if the wearable is a diamond ring, educational information could include information about where diamonds are mined, how they are cut, and how diamonds are priced. Educational information for a diamond ring would exclude the weight, color, clarity etc of that particular diamond.

Educational information can be static, dynamic, or some combination of static and dynamic. Education information can also change over time, so that for example, first use of a wearable trigger object might be used by a given student to access educational information from a lower grade level curriculum, and a subsequent use of the same (or different), wearable might be used to access additional educational information from a higher (or different) grade level curriculum. It is still further contemplated that using two or more wearable trigger objects in concert might be used to access different educational information than would be accessed by each of the wearable objects by themselves.

As used herein, the terms "source" and "sourcing" means to procure. Procuring can include identifying, finding, retrieving and filtering.

As used herein, the terms "trigger" and "triggering" with respect to "rendering of educational information to the user" means taking steps to provide the educational information to the user. This includes both directly and indirectly causing the educational information to be rendered to the user.

All suitable wearable trigger objects are contemplated, especially charms, pendants, lockets, necklaces, bracelets, cuffs, rings, hair bands, earrings, piercings, tie-clips, hair-clips, badges, anklets, brooches, pins, or other jewelry.

The wearable trigger object can optionally include one or more location, light, motion, heat, or pressure sensors, the output of which can advantageously be used to further select the educational information rendered to the user. Alternatively or additionally, the educational information can be related to the external shape of the wearable trigger object. Wearable trigger objects can optionally include a speaker, which can be used to render at least a portion of the educational information to the user. Still further, wearable trigger objects can optionally include an electronic display, which can be used to render at least a portion of the educational information.

The code carried by the wearable trigger object can have any suitable format. Contemplated codes include those unique to the individual wearable trigger object, as well as those that are quasi-unique, i.e., representative of a group of trigger devices that includes the wearable trigger object. In the latter category, there might be a single code for a group of pyramidal charms.

Thus, a method of assisting in education of a student can comprise the steps of (a) providing the student with a curriculum; (b) directing the student to utilize a wearable that carries a code; and (c) directing the student to utilize electronics to review information selected from the curriculum, as a function of the code. In such circumstances, the information can advantageously be contextually related (a) to appearance of the wearable and (b) at least one education-related attribute of the user. And among other things, the rendered information can be used to unlock a portion of an educational assignment.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The preferred embodiments of the invention will hereinafter be described in conjunction with the appended drawings, provided to illustrate and not to limit the invention.

DETAILED DESCRIPTION

Figure 1:
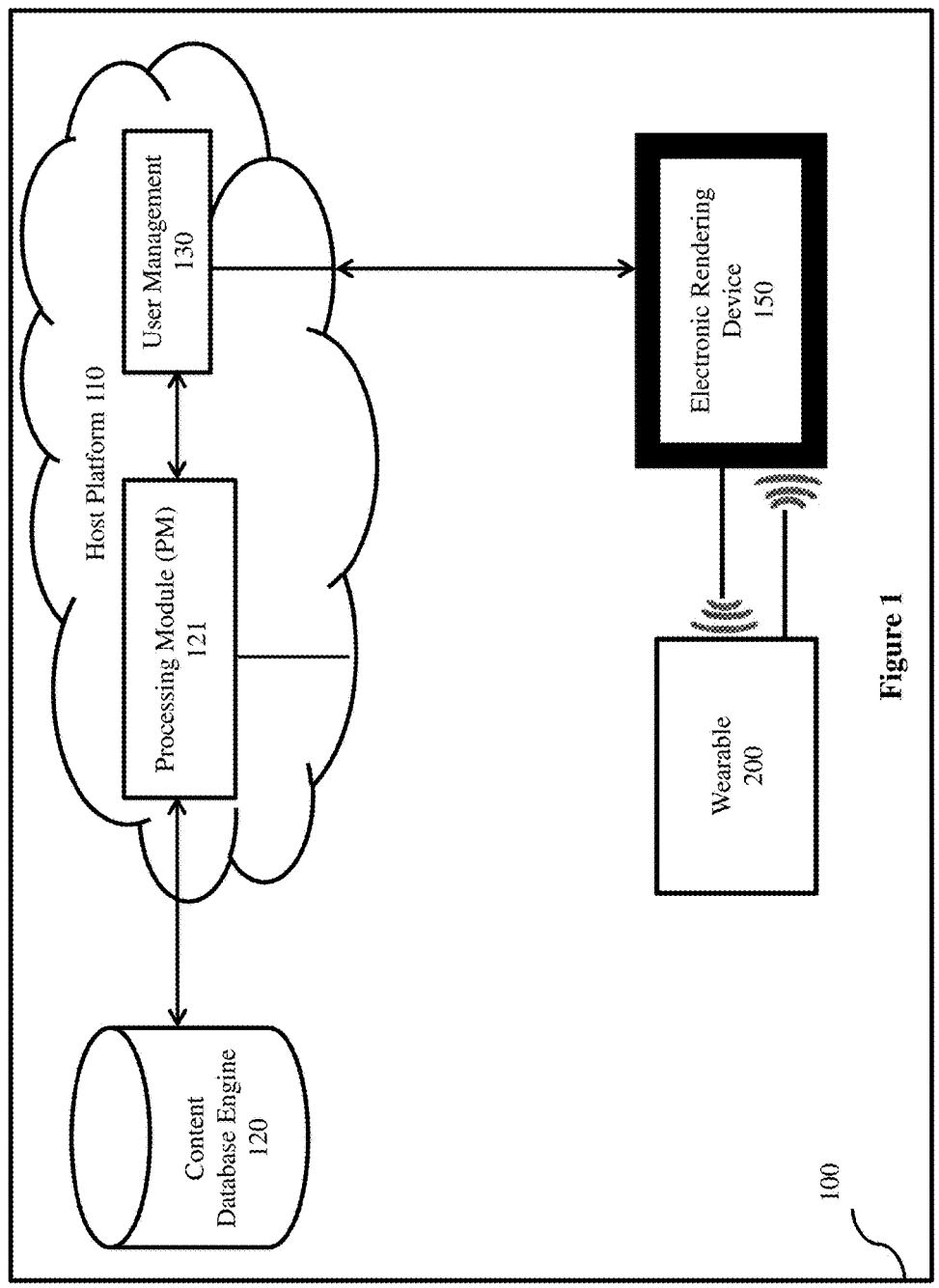
FIG. 1 is a general architecture of a system 100 showing schematic of delivery of contextual educational information from a wearable 200.

The features, structures, or characteristics of the application described throughout this specification may be combined in any suitable manner in one or more embodiments. For example, the usage of the phrases "example embodiments", some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

In FIG. 1, a system 100 for delivering contextual educational information generally includes a host platform 110, a content database engine 120, a processing module (PM) 121, a user management system 130, one or more wearables 200, and one or more electronic rendering device 150.

In operation, an instance of wearable 200 is coupled (wirelessly or by hardwire) to an electronic rendering device 150, which then receives from the wearable 200 a communication containing an identification data 205. The identification data 205 is utilized by the host platform 110 to derive contextual educational information from the content database engine 120. In some embodiments, the host platform 110 can also retrieve user information from the user management system 130 to deliver tailored educational content. The educational information can be accessed via wearable display 240, electronic rendering device 150 or compatible terminals.

Figure 2:
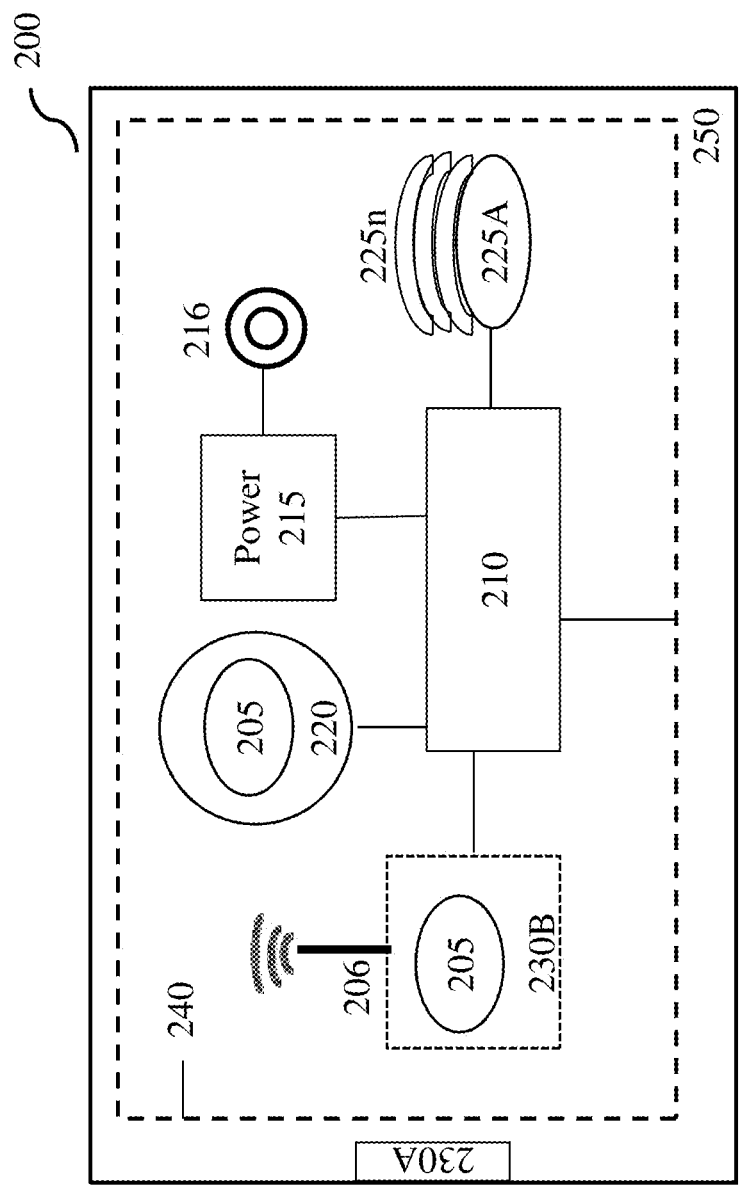
FIG. 2 is a schematic of components of a wearable 200.
Figure 3:
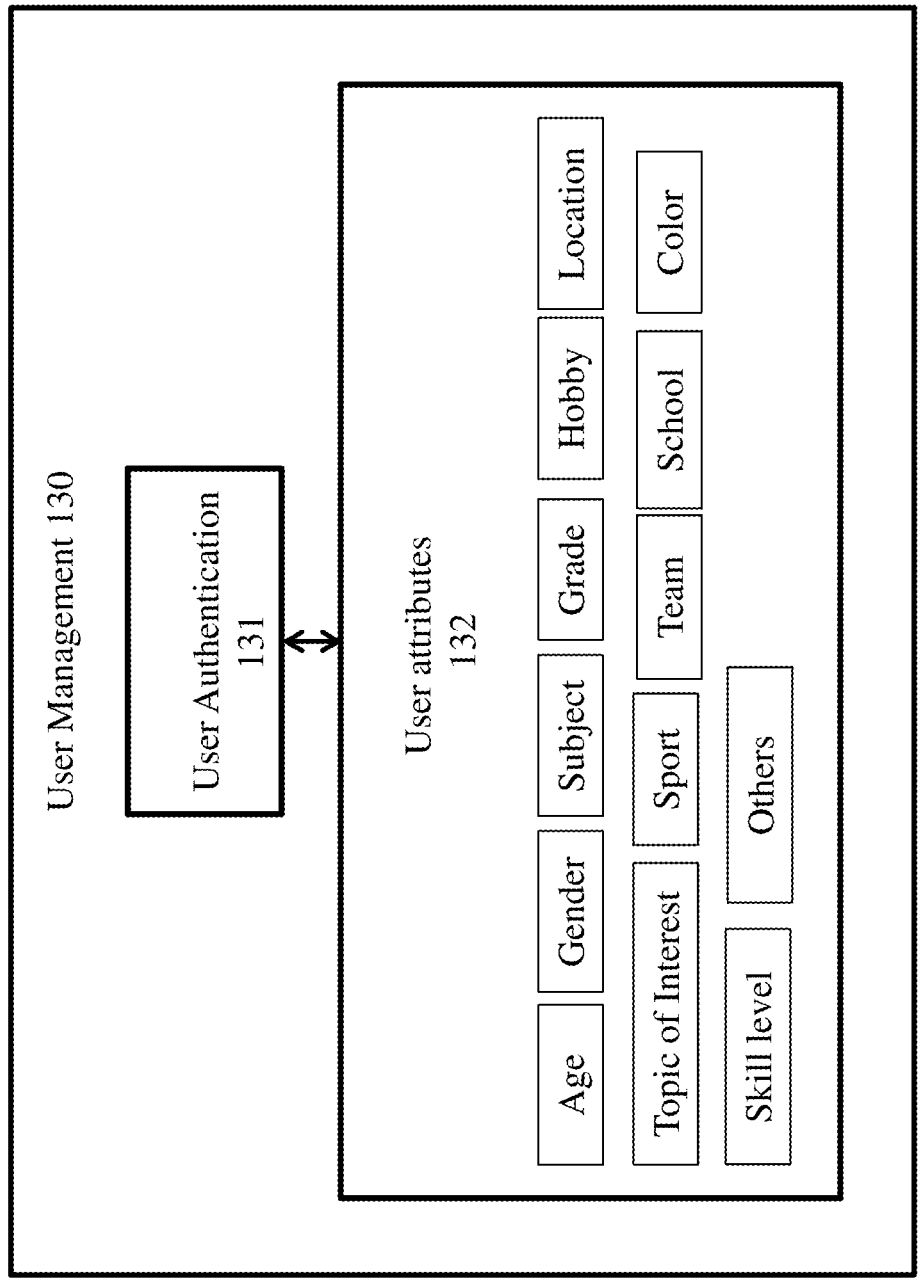
FIG. 3 is a schematic of user management system 130 comprised of user authentication 131 and education-related user attributes 132.
Figure 4:
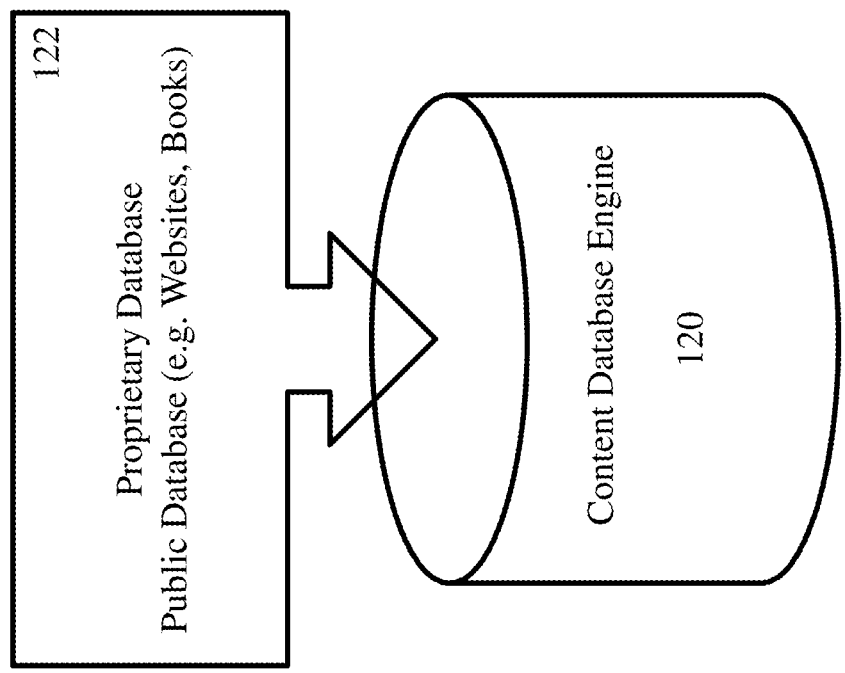
FIG. 4 is a schematic of sources contemplated for content database engine 120.

The wearable 200, the user management system 130, and the content database engine 120, are further described in FIG. 2, FIG. 3 and FIG. 4, respectively.

In FIG. 2, wearable 200 generally includes a control chip 210, a power supply 215, memory 220, one or more sensors 225A-n, one or both of a hardwire connector 230A and wireless connection electronics 230B, and a display 240, all contained within a housing 250.

Wearable 200 is any item that can be worn on a person, as well as any item that can reasonably be carried in or on a person's clothing. Representative members of this group include, for example, charms, pendants, lockets, necklaces, bracelets, cuffs, rings, hair-clips, earrings, piercings, tie-clips, anklets, brooches, and non-jewelry items including non-decorative key chains, badges, and pins.

Control chip 210 operationally couples all of the other components within the housing 250. All suitable control chips are contemplated, including for example ARM®, AVR®, PIC®. Control chip 210 is preferably low power, for example using less than 3.6 V, and also preferably has a deep sleep cycle. Peripheral functions, including sensors, power and wireless, may be integrated into the control chip 210 to mimic a System on a Chip (SOC) architecture.

Power supply 215 should be construed as any suitable source of electrical power. Power supply 215 is preferably a secondary battery, charged from time to time by an inductive circuit 216. Alternatively, power supply 215 could be a fixed or replaceable primary battery, or a capacitor. Power could also be provided by an RFID chip, included in the wireless connection electronics 230B.

Memory 220, preferably a nonvolatile memory, is intended for storing identification data 205 for the wearable 200, and optionally a URL link, inventory identification code, user name, user data, access history and possibly other identification. Alternatively, the memory 220 can be native to, and form an integral part of the control chip 210, the hardwire connector 230A, or wireless connection electronics 230B. The information to be contained within the memory 220 can be programmed prior to installation within the housing 250, or programmed prior to or during usage of the wearable 200. Housing 250 can be big or small in size, such that it can be affixed inside or outside the wearable 200. The housing 250 may be shaped to be compatible to the design attributes of the wearable 200.

Contemplated sensors 225A-n may include single or a combination of audio, light, motion, tactile, image, optical, location, vibration, temperature and pressure sensors, as an example. For instance, a location sensor 225n can be used to provide the geographical or vicinity information of the wearable 200 to the control chip 210.

Wearable 200 can communicate with electronic rendering device 150 using any suitable communication apparatus and protocol. One method is through wireless electronics 230B, which can use any suitable wireless technology e.g. Wi-Fi, Bluetooth, Radio frequency identification (RFID), Near-field communication (NFC), etc. The preferred contemplated wireless technologies include RFID and NFC. RFID system may be an active, semi-active or passive capable of transmitting data to interface device(s) 150. Active RFID systems generally possess a power source and an antenna, which allow a broader reading range (typically up to 100 m). Passive or semi-passive RFID systems are powered by the electromagnetic energy transmitted by the electronic rendering device 150 (interrogator), and typically have a reading range from near contact up to 25 meters. NFC systems enable short range two-way communication between devices in close proximity, for instance the wearable 200 and the electronic rendering device 150.

Communication between the wearable 200 and the electronic rendering device 150 is also contemplated via a wired connection, for example using hardwire connector 230A. This interface may be enabled using proprietary connectors, or standardized connectors such as USB 2, USB 3, USB type 'C', optical fiber, etc. Optionally, the wired hardware connector can also serve as a power charging source for the power supply 215.

Still a third contemplated means of communication between the wearable 200 and the electronic rendering device 150 is optical communication. For example, electronic display 240 can render a static or dynamic image pattern. Or the wearable 200 could display a printed single or multi-dimensional bar code. In yet another example, a wearable 200 could communicate with the electronic rendering device 150 by a physical shape of the wearable. It is contemplated that such optical communication could be transmitted other than through an optical fiber.

Display 240 is preferably solid state, as for example a diode or diode array. Use of diodes is preferred because they typically have very low power requirements, very long lifetimes, and also because they are highly resistant to impact damage. Examples include LED and OLED displays. It is also contemplated that display 240 could be chemiluminescent, but of course in that case the display might only work once. A single housing 250 could incorporate multiple displays. Optionally the display may be complemented or substituted by an alternate output device(s)—examples include audio speaker, vibratory motor, e-ink panel, or alarm.

Identification data 205 is preferably tied to a size-independent appearance of the wearable. For example, a labrador-shaped bracelet charm might have the same identification data as a labrador-shaped cufflink, and in that instance they would both would retrieve the same information from the content database engine. A pyramidal bracelet charm, however, would have a different identification data. In this manner, the size-independent appearance of the wearable is used as a key, via the identification data, to retrieve related knowledge.

Any suitable degree of granularity can be used. In the above example, it could be that all dog-shaped wearables could have the same identification data, and alternatively it could be that different wearables shaped as different breeds could have different identification data. It is even contemplated that different colorations on the wearables depicting the same breed of dog could have different identification data. Or a dog-shaped wearable in which the dog has only three legs could have yet another identification data—one that might trigger receipt of information about dog injuries or dog anatomy.

Identification data 205 can be any information suitable to distinguish different size-independent appearances of the wearables. Contemplated identification data 205 include combinations of letters, numbers and other characters, preferably of sufficient complexity to provide millions of unique combination. Optionally, identification data 205 could include other information besides mere identification codes, for example, a URL link, an inventory code, a user name or other user data, and access history.

The electronic rendering device 150 is capable of connecting via wireless or wired mode to the wearable 200 to establish a one-way or preferably a two-way communication. This is likely enabled via the interfaces 230A and 230B integrated in the wearable 200, as described in aforementioned sections. Contemplated interface devices 150 may be in the form of laptops, tablets, mini-tablets, desktops, smart phones, cellular phones, personal digital assistants, smart watches, or other digital electronics with the needed connectivity.

The electronic rendering device 150 is linked to the host platform 110. Host platform 110 is located on the host server, which could be a physical infrastructure or a cloud service. The key elements of the platform include processing module (PM) 121 and user management system 130 comprised of user authentication 131 and education-related user attribute 132. The host platform 110 is linked to a content database engine 120. Optionally, the content database 120 can be integrated within the host platform 110 itself.

As shown in FIG. 3, the function of education-related user attribute 132 system is to store education-related attributes, examples of which includes current age, gender, subject being studied, current grade level, hobby, ethnicity, profession, vocation, location of interest, topic of interest, time period of interest, event of interest, favorite sport, favorite team, current school, color preference, resource preference, brand affinity, expertise level, etc. The term user can refer to an individual entity or a group of users with common attributes. Examples of the latter includes users with a wearable bracelet depicting 3-legged Labradors, and users with wearable charms depicting a glacier. FIG. 3 should be interpreted to include all of the education-related attributes described above.

The sources for the content database engine 120 may include and is not limited to books, publications, journals, literature, public or licensed online engines, social media, peer networks, and educational networks (FIG. 4). The content database 120 may also include information processing, language processing, and deep learning platforms such as Watson™, Alexa™, etc.

Figure 5:
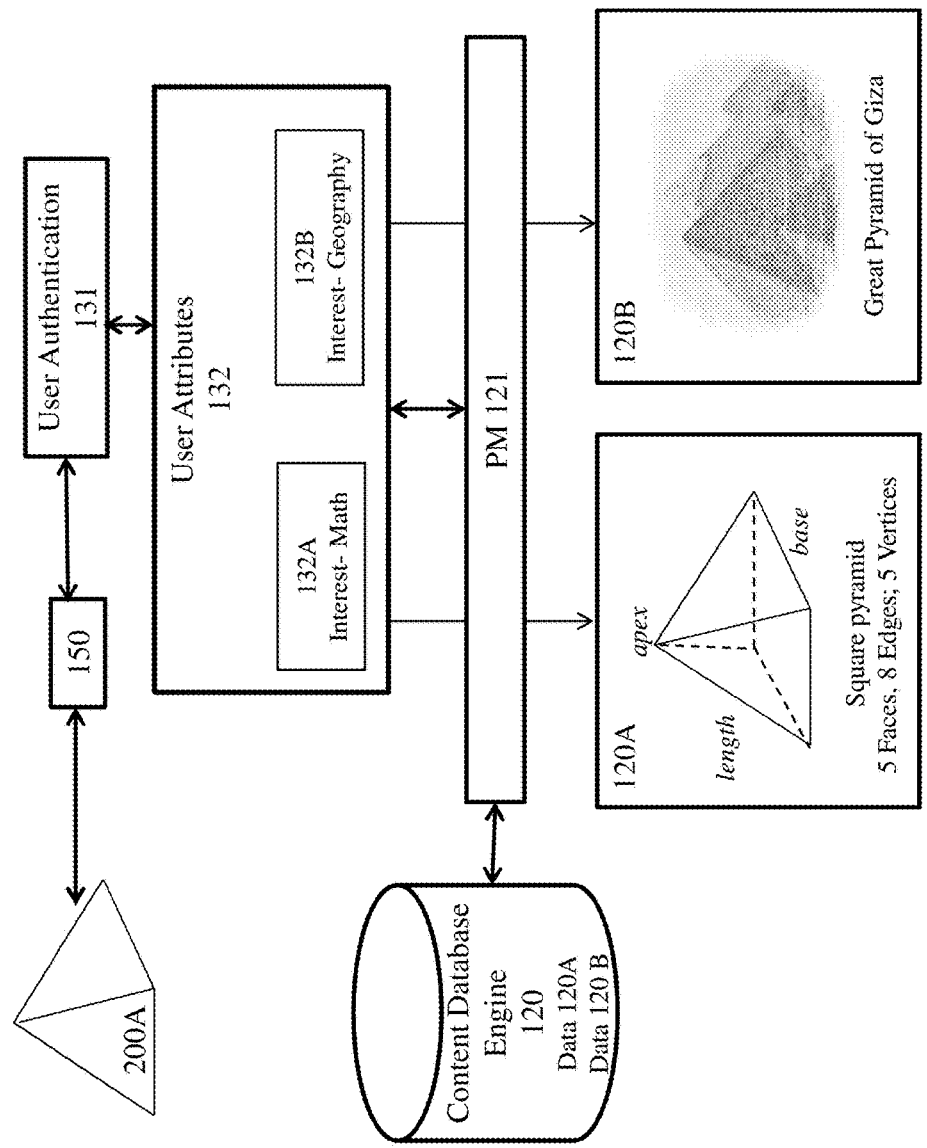
FIG. 5 is an example demonstrating the contextual information 120A-120B delivered from a size-independent pyramid-shaped wearable 200A using a single education-related user attribute 132.

FIG. 5 details delivery of information that is contextually related to the size-independent appearance of the wearable 200 using a single education-related user attribute 132. In this example, the wearable 200A is a pyramid shaped jewelry. Operationally, the electronic rendering device 150 reads the wearable 200A using radiofrequency, optical, topography, or any pertinent means. The information is then transmitted to the host platform 110. The host platform 110 may direct the user to enter in the information relevant to authentication 131, and input/modify education-related user attributes 132. The host platform 110 has an integral processing module 121 that is capable of processing the information from the wearable 200A and the education-related user attribute system 132, and is linked to the content database 120. In this case, PM 121 recognizes wearable 200A as a 'pyramid' and education-related user attribute 132A as 'Interest=math', and thereby renders contextual information 120A 'A pyramid described in context with a mathematical framework'. In contrast, if the education-related user attribute is 132B 'Interest=geography', then the PRM 121 utilizes this input in conjunction with the wearable 200A 'pyramid' to render contextual information 120B, which in this case is 'Pyramids of Giza i.e. pyramids in context to a geographical framework'. In any case, the rendered information can be rendered in any appropriate matter, for example using one or more of the electronic rendering device 150, the wearable 200A, or a different laptop, tablet, TV, audio device, etc.

Figure 6:
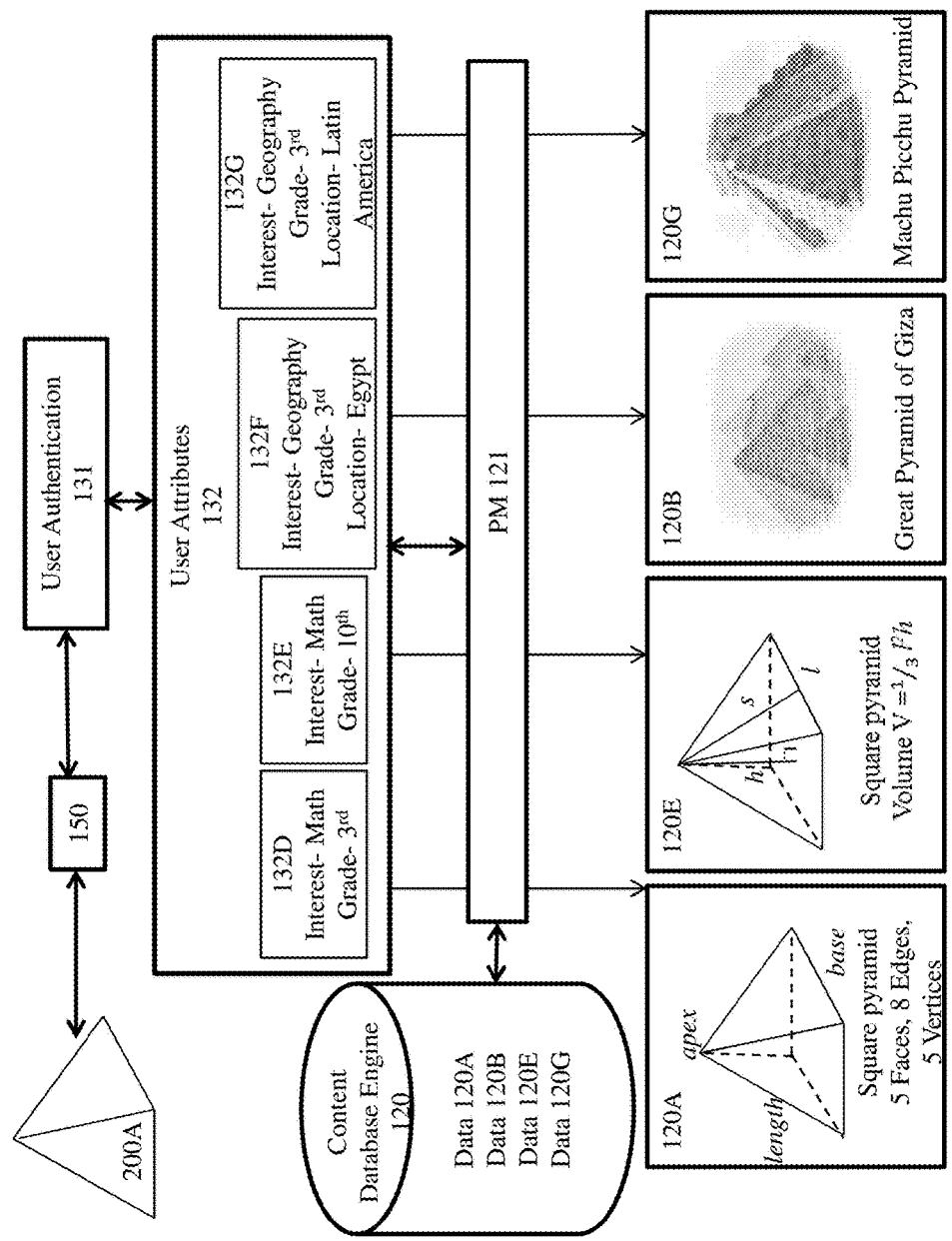
FIG. 6 exemplifies the contextual information 120A, 120B, 120E, 120G delivered from a pyramid-shaped wearable 200A using multiple education-related user attributes 132.

FIG. 6 further exemplifies aspects of the inventive subject matter by deploying multiple education-related user attributes 132. Using a pyramid shaped jewelry as wearable 200A and "Interest=Math, and Grade=$3^{rd}$" as the education-related user attribute 132D, the contextual output 120A rendered is "A pyramid explained in mathematical terms that is suitable for a $3^{rd}$ grade user". In contrast, if the education-related user attribute 132E is "Interest=Math, and Grade=$10^{th}$", then the corresponding contextual output 120E is "A pyramid described in advanced mathematical terms suitable for a $10^{th}$ grader". Now considering another scenario of the education-related user attribute 132F "Interest=Geography, Grade=3$^{rd}$, and Location=Egypt" the contextual output 120B is "A pyramid illustration considering a 3$^{rd}$ grade level and geographically related to Egyptian pyramids". Alternatively, the education-related user attribute 132G "Interest=Geography, Grade=3rd, and Location=Latin America" will provide a contextual output 120G "A pyramid illustration considering a 3rd grade level and geographically related to Latin America pyramids".

It should be noted that parts of the education-related user attribute 132 data can be provided by a user him/herself, and/or derived from the wearable 200 or electronic rendering device 150 directly. For example, the geographical output 132F and 132G can be entered by the user specifying location in education-related user attributes 132, or derived based on sensors 225 placed within the wearable 200, or be based on geo-tagging data from the electronic rendering device 150.

The host platform 110 output is not limited to static information, and can additionally or alternatively be in interactive formats, including for example, quiz, game, trivia, puzzle, videos etc.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions. One should appreciate that the technical effects include using physical trigger object to facilitate retrieval of educational content.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of using a wearable trigger object to assist in education of a student, the method comprising:
    receiving object identification information from an electronic reader device operated by the student upon the wearable trigger object, wherein the electronic reader device is distinct from the wearable trigger object;
    receiving student attribute information selected from the group consisting of the student's current age, the student's gender, a subject currently being studied by the student, the student's current grade level, a hobby of the student, an ethnicity of the student, a profession of the student, a vocation of the student, a location of interest to the student, a topic of interest to the student, a time period of interest to the student, an event of interest to the student, a favorite sport of the student, a favorite team of the student, a current school of the student, a color preference of the student, a resource preference of the student, a brand affinity of the student, and an expertise level of the student in a field of endeavor;
    utilizing the object identification information to ascertain a shape of the wearable, and utilizing (a) the shape and (b) the student attribute information to source educational content from a curriculum of the student; and
    rendering the educational content to the student through an electronic rendering device operated by the student.

2. The method of claim 1, wherein the wearable trigger object has a form selected from the group consisting of a charm, a pendant, a locket, a necklace, a bracelet, a cuff, a ring, a hair band, an earring, a piercing, an anklet, a tie-clip, a hair-clip, a badge, a brooch, a key-chain, and a pin.

3. The method of claim 1, wherein the wearable trigger object includes a sensor configured to detect at least one of the following characteristics: ambient location, ambient light, ambient motion, ambient heat, and ambient pressure.

4. The method of claim 1, wherein the object identification information is unique to the wearable trigger object.

5. The method of claim 1, wherein the object identification information is representative of a group of trigger devices that includes the wearable trigger object.

6. The method of claim 1, further comprising obtaining the first education-related student attribute from a data store external to the trigger object.

7. The method of claim 1, comprising utilizing supplemental sensory information provided by the wearable trigger object to further assist in sourcing the educational content.

8. The method of claim 1, wherein the step of providing the educational content to the student further comprises providing at least some of the educational content in an interactive format.

9. The method of claim 1, further comprising utilizing (a) the object identification information, and (b) at least the student attribute information to source additional educational content, wherein at least some of the additional educational content is sourced external to the electronic rendering device.

10. The method of claim 9, wherein the curriculum is specific to the student's current grade level.

11. The method of claim 1, further comprising using the electronic reader device to derive additional object identification information from a second trigger object, and utilizing (a) the additional object identification information, and (b) the student attribute information to source additional educational content.

12. The method of claim 1, wherein at least a portion of the educational content rendered to the student varies over time.

13. The method of claim 1, wherein the wearable trigger object includes a speaker, and further comprising utilizing the speaker to render at least a portion of the educational content to the student.

14. The method of claim 1, wherein the trigger object includes an electronic display, and further comprising utilizing the electronic display to render at least a portion of the educational content to the student.

15. A method of assisting in education of a student, comprising:
  providing the student with a curriculum; directing the student to utilize a wearable that has an external shape, and carries an electronically readable code indicative of the shape;
  directing the student to utilize an electronic rendering device, different from the wearable, to review educational content selected from the curriculum, as a function of the code;
  wherein the educational content is contextually related to (a) appearance of the wearable as indicated by the code, and (b) at least one attribute of the student; and
  wherein the at least one attribute is selected from the group consisting of the student's current age, the student's gender, a subject being currently studied by the student, the student's current grade level, a hobby of the student, an ethnicity of the student, a profession of the student, vocation of the student, a location of interest to the student, a topic of interest to the student, a time period of interest to the student, an event of interest to the student, a favorite sport of the student, a favorite team, a current school of the student, a color preference of the student, a resource preference of the student, a brand affinity of the student, and an expertise level of the student in a field of endeavor.

16. The method of claim 15, wherein the educational content changes over time as a function of at least one of (a) age of the student; (b) past usage of the curriculum by the student; (c) past usage of the wearable by the student.

17. The method of claim 15, further comprising using at least one of (a) the code and (b) the rendered information to unlock a portion of an educational assignment.

* * * * *